G. CLEMENTS.
POT-COVER.
No. 173,766. Patented Feb. 22, 1876.
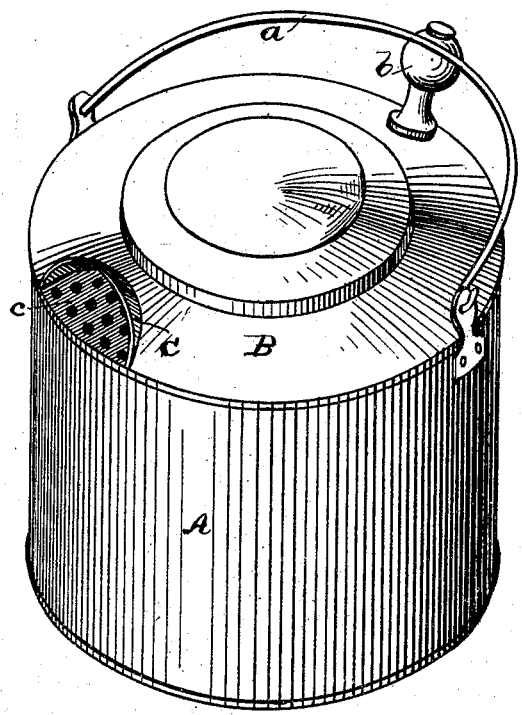
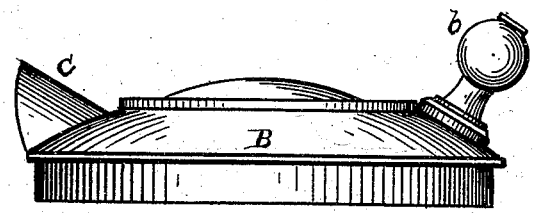
WITNESSES:
Jas. F. Duhamel,
Thomas Byrne.
INVENTOR:
George Clements.
PER
H. F. Abbot.
ATTORNEY.

UNITED STATES PATENT OFFICE.

GEORGE CLEMENTS, OF NEW MILFORD, PENNSYLVANIA.

IMPROVEMENT IN POT-COVERS.

Specification forming part of Letters Patent No. 173,766, dated February 22, 1876; application filed December 8, 1875.

*To all whom it may concern:*

Be it known that I, GEORGE CLEMENTS, of New Milford, in the county of Susquehanna and State of Pennsylvania, have invented certain new and useful Improvements in Covers for Pots and Kettles, of which the following is a specification:

The nature of my invention relates to the construction of covers for pots and kettles, as will be hereinafter more fully set forth.

In order to enable others skilled in the art to which my invention appertains to make and use the same, I will now proceed to describe its construction and operation, referring to the annexed drawing, which forms a part of this specification, and which represents a perspective view of a pot or kettle with my improved cover attached.

A represents an ordinary pot or kettle, and provided with the cover B. Near the outer edge of this cover are a number of perforations, c, which are partly covered by a lip, C, as seen in the drawing. The perforations act as an escape for steam when boiling, and for draining off the water after boiling vegetables, &c., and the lip acts as a fender to keep the steam from arising perpendicularly and burning the hands when attempting to pour off the water.

On the side of the cover opposite the perforations is a knob, b, of wood or other material that is a feeble or non conductor of heat, which is used as a handle for the cover, and as a rest for the bail a of the kettle. The knob b may be also used to steady the kettle when draining off hot water, as there is no danger of burning the hand on account of it being a feeble or non conductor of heat.

Having thus fully described my invention, what I claim as new, and desire to secure by Letters Patent, is—

The combination, with the pot-lid B, of the non-conductive bail-supporting knob b, perforations c, and lip or shield C, substantially as shown and described.

In testimony that I claim the foregoing as my own I affix my signature in presence of two witnesses.

GEORGE CLEMENTS.

Witnesses:
CYRUS BARLOW,
H. M. TINGLEY.